June 12, 1956

H. GEHRE 2,749,752

METER FOR MEASURING THE VOLUME OF
FLUIDS FLOWING IN A PIPE LINE

Filed Aug. 1, 1951

Inventor:
Hans Gehre
By
Burgess + Dinklage
attorneys

June 12, 1956  H. GEHRE  2,749,752
METER FOR MEASURING THE VOLUME OF
FLUIDS FLOWING IN A PIPE LINE Filed Aug. 1, 1951  3 Sheets—Sheet 2

Inventor:
Hans Gehre
By
Burgess + Dinklage
Attorneys

June 12, 1956

H. GEHRE 2,749,752

METER FOR MEASURING THE VOLUME OF
FLUIDS FLOWING IN A PIPE LINE

Filed Aug. 1, 1951

INVENTOR
HANS GEHRE.

BY *Burgess and Dinklage*

ATTORNEYS

United States Patent Office 2,749,752
Patented June 12, 1956

2,749,752

METER FOR MEASURING THE VOLUME OF FLUIDS FLOWING IN A PIPE LINE

Hans Gehre, Oberkassel (Rhine), Siegkreis, Germany, assignor to Elster & Co., Mainz, Germany, a corporation of Germany Application August 1, 1951, Serial No. 239,648

Claims priority, application Germany August 9, 1950

19 Claims. (Cl. 73—230)

This invention relates to meters for measuring the volume of fluids flowing in a pipe line. It more particularly relates to meters having turbines for the impulse-measuring indication of volumes of liquid or gas flowing in a pipe line.

In meters of this type, the proportionality between the velocity with which the fluid flows past the meter wheel and the rate of flow forms the basis of measurement. The velocity of flow may be measured by the impulse which the fluid exerts on the meter wheel. This impulse varies according to the square of the velocity of flow.

In practical operation because of this, a change in the velocity of flow at a higher rate of flow will be reflected in the impulse measurement much more than a similar change of velocity at a lower rate of flow.

Because of this, these meters have the disadvantage that their error curve in the lower part of the measuring range falls too soon, even at 25% to 20% of the normal loading. This results in a progressively increasing minus error out of the error limits determined to be practically allowable, and the use of tricky and complicated calculations is necessary in order to decrease the lower limit of the practical useability of these meters to about 10% of the mean loading. In addition, the density of the material measured influences the impulses so that the error in the resulting velocity of rotation increases as the density of the fluid decreases. Finally, in gases and vapors the volume expansion in the outflow from the throttle openings will cause a greater plus error to occur as this expansion increases with the square of the velocity of flow, and thus in the upper part of the measuring range the impulse progressively rises with a rising rate of flow.

Many attempts have been made, and many measurements effected, in order to obtain a correction for these errors. These measurements and attempts have, however, proven unsatisfactory since they are either very costly or not sufficiently comprehensive in their effect to justify their use.

Attempts have also been made to eliminate these errors by constructing meters in which the proportionality between the meter wheel velocity and the rate of flow does not depend upon the aforementioned conditions but is produced by auxiliary devices and in which, for example, a float is constructed as a turbine rotor which serves as the meter wheel and which frees various sizes of flow cross-section in its different open positions. By this construction, approximately constant overflow velocity is given for all loadings, and the proportionality between the rate of flow and the velocity of rotation will be attained, in one case by the different amount of a liquid resistance provided to be overcome by the measuring wheel in its various open positions, and in another case by the use of brake devices.

These constructions, however, have never led to practical results since, according to the physical laws by which the drive and resistance are governed, a balance position is obtained between them which in effect makes the required proportionality unattainable, and moreover gives a progressively increasing inaccuracy of the resulting velocity of rotation with a decreasing rate of flow.

In addition, these constructions are impractical if gaseous materials are to be measured for on one hand the specific gravity which is determining for the retardation or ventilation resistance is about a thousand times smaller in these materials than in water, and on the other hand the resistances increase with the third power of the velocity so that for the gas volume meter about tenfold velocities are given as compared with proportions in liquid meters, which is insupportable in view of the required safety of the operation.

One object of this invention is a construction of measuring wheel meters for impulse-measuring indications of volumes of a fluid flowing in a pipe line which will overcome all the aforementioned difficulties. This and still further objects will become apparent from the following description read in conjunction with the drawings in which.

Figure 1:
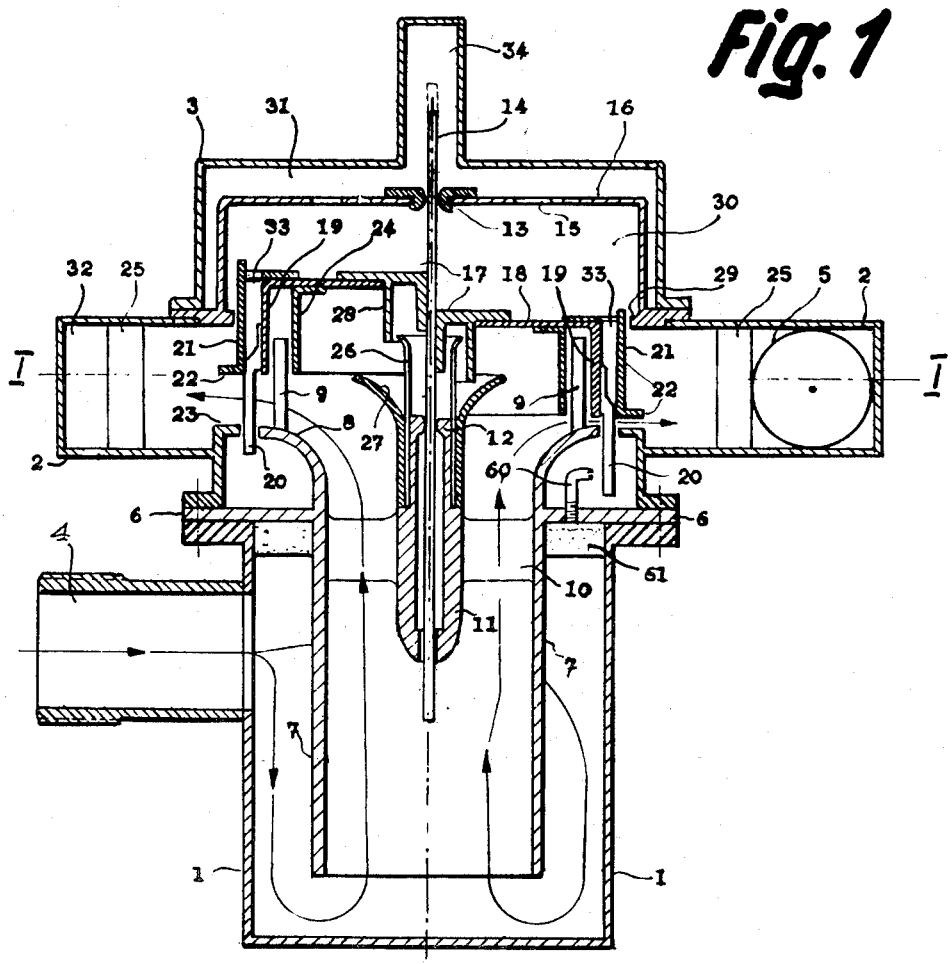
Fig. 1 shows a vertical axial section of a meter construction in accordance with the invention.

The present invention avoids the above-mentioned difficulties and enables measuring-wheel-meters to be constructed of which the lower measuring-range-limit lies at about 2–3% of its mean loading. It relates to measuring-wheel-meters of that kind, in which a floater constructed as a type of turbine rotor serves as the meter-wheel, which in various different operating positions frees various sizes of flow cross-section.

According to the invention the turbine-rotor is formed closed on the sides and top but open at the bottom as, for example, a cylinder closed on the top and open at the bottom. This shape will be referred to hereinafter as "bell shaped." Around the rotor are provided blades, vanes, or the like, pointing downwardly, whilst the end of the passageway cooperating with it carries a circle of vanes pointing upwardly, which stand opposite the rotor blades at a shorter radius as guide-vanes and engage therein at a greater or lesser depth according to the open position of the floater bell, and the proportionality between the rotor's rotating velocity and the rate of flow is obtained in that the direction of flow of the material against the rotor blades is variable in dependence on the position of the rotor bell. This occurs preferably without the use of energy-consuming auxiliary means in a simple kinetic way by the vanes or blades of at least one of the two circles having a torsional shape with an increasing or decreasing pitch through which, in the various open positions of the floater, different triangles of velocities are given by the cross-sections of the guide-vanes and the rotor blades lying opposite each other in the outflow or measuring cross-section and which are determined graphically, so that the rotor-velocity produced gives the proportionality or other desired relation to the rate of flow.

The invention can be better understood with reference to some embodiments illustrated in the drawings. In all figures, the same or corresponding parts are given the same reference numbers.

Figure 2:
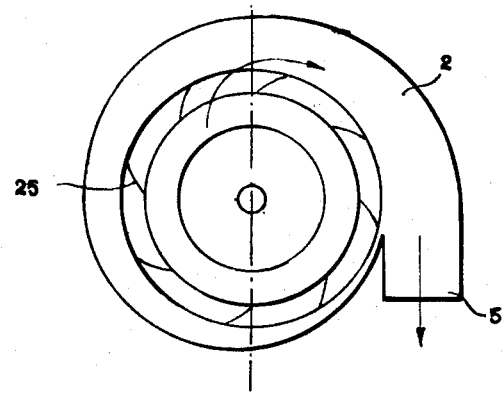
Fig. 2 shows a section through the plane I—I in Fig. 1.

Fig. 1 shows an axial vertical section through the meter, the housing of which comprises three coaxially arranged, rigidly interconnected parts 1, 2 and 3. The lower part 1 carries the entry pipe 4, the central part 2 spirally constructed like a blast or centrifugal pump and carrying the exit-pipe 5, as shown on the right by a circle. A horizontal section through the housing part 2 along the line I—I is shown in Fig. 2 on a smaller scale.

The upper part 3 of the housing forms a bell-shaped closure for its central part 2. Between these and the lower housing part 1 a cylindrical tube 7 is secured by a flange 6 in coaxial relationship, the upper end 8 of which tube 7 is flared out in a trumpet-shape and carries a coaxially-located circle of upstanding guide-vanes 9. A shell 11 secured axially in the cylindrical tube 7 by radial ribs 10 forms a neck-bearing 12, which together with a neck-bearing 13 located in the upper housing-part 3, forms the journalling for the rotor-shaft 14. A coaxial flanged bell 16 between the housing parts 2 and 3 serves as the support for the upper neck-bearing 13, and is provided with openings 15 for the material being measured.

The meter-wheel is located on the shaft 14 by means of a hub 17. It is formed as a turbine-rotor in the shape of a shallow bell 18, on whose outer cylindrical wall 19 a circle of downwardly-directed blades 20 are secured. These blades are also connected to a concentrically positioned cylindrical ring 21 of slightly greater diameter. Ring 21 has a flange-like lower rim 22. This flange is exactly opposite a corresponding flange 23 provided on the housing part 2. Flange 23 surrounds the rim of the trumpet-shaped flared part 8 of the cylindrical tube 7, defining a space, in which the rotor blades 20 engage.

A further cylindrical ring 24 is secured inside the bell 18. It serves to obtain an ordered flow in the region of the blades and vanes 20 and 9, and also as an effective protection against soiling by dust or condensates separating from the fluid to be measured. In the housing-part 2, further oblique guide-plates 25 are provided which are arranged concentrically to the axis of the rotor-shaft 14. From their outer edges the housing-part 2 is formed spiral-shaped in the above-mentioned way.

The rotor-shaft 14 is easily moved up and down in the neck-bearings 12 and 13, and with it the turbine-rotor with its auxiliary parts (parts 17 to 22 and 24), wherein this movement is limited by stops (not shown). In the right-hand half of Fig. 1, the turbine-rotor is shown located near its lower end position just before the closure of the passageway, and the left-hand half shows it in about a half open position. Of course, the entire rotor is constructed as one rigid piece, and one half cannot move in relation to the other. Each half of Fig. 1 is shown in a different rotor position for the sake of illustration. However, in actual construction, part 17 is one integral piece the top of which forms a flat plane. The shell 11 has on its upper end two concentrically arranged cups 26 and 27, which are opened out to different widths and cooperate with a cylindrical ring 28 provided on the hub 17 to prevent soiling and thus protect the rotor-shaft 14 and its journalling. Moreover, the cup 27 has the purpose of guiding the flow of material to the split-ring limited by the parts 19, 22 and 24 of the rotor on the one side, and the flange 23 on the other side, which forms the measuring cross-section.

The flange of the bell 16 in the housing-part 3 is formed at its inner rim 29 with a thickening having the effect of a labyrinth seal, by which the spaces 30 and 31 are separated from the exit-space 32 of the housing-part. These spaces 30 and 31 stand over the annular space 33 formed by the cylinders 19 and 21 in connection with the outflow and measuring cross-section in which the rotor-blade circle 20 moves. The housing-part 3 carries at the top an extension 34 into which the upper end of the rotor-shaft 14 projects and from which ordinary means (not shown) transmit the rotation of the rotor-shaft to the counting mechanism. The register actuating gearing and its mode of cooperation with the slidable shaft 14 does not form part of the subject matter of the instant invention and may be effected in any conventional manner.

The material being measured enters at 4, flows through the annular space formed by the housing 1 and the tube 7, then beneath and up the inside of the tube 7, under the rotor-bell 18, then in the measuring cross-section with increased velocity first through the guide-vane circle 9, then through the rotor-blade circle 20 and finally after passing the guide-plates 25 flows through the spiral exit-chamber 32 to the exit-pipe 5.

The material measured attains its greatest velocity and least pressure in the rotor-vane circle 20, whereas it has a small velocity and about its greatest pressure under the bell-shaped rotor of the meter-wheel because of the damming-up of pressure. Since the smaller pressure of the measuring cross-section transfers through the annular space 33 to the spaces 30 and 31, the two sides of the rotor are under a pressure-difference. If this has become so great that it overcomes the weight of the turbine-rotor with all its auxiliary parts, then the rotor and its attached parts rise, whereby the cylinder 19 rises from the upper part 8 of the tube 7, the passage of the material to the rotor-vanes 20 occurs freely and the rotor of the meter-wheel begins to rotate, floating on the material being measured.

The greater the rate of flow of the material being measured, the higher is the rotating system raised, without the effective pressure-difference in front of and behind the measuring cross-section and thus below and above the turbine-rotor changing. Since neither the weight of the rotating-system alters nor its surfaces impinged on by the material being measured except for the rotor blade area, the velocity of flow of the material being measured remains constant in the region of the vane-circles 9 and 20 for all meter-loadings. As only the outflow and measuring cross-section changes and does so in proportion to the rate of flow, with a constant pitch of the guide-vanes and rotor-blades, the meter-wheel would always run with the same velocity, in spite of the rate of flow at any moment which would only determine its vertical position. Any braking force originated by currents can be considered as negligible because of its smallness.

In order to change the rotational rate of the rotor with any change in the rate of flow, at least one of the guide-vanes and the rotor-blades should have a torsional shape with an increasing angle of pitch along its length. The guide-vanes and rotor-blades as shown have an increasing pitch because of which different angles of flow on the various blade and vane sections lying opposite each other in the various open positions of the rotor in the measuring cross-section occur, and different triangles of velocities and resultant vectors are obtained. The shape of the vanes is determined graphically so that the velocity of rotation imparted to the rotor is proportional to the rate of flow.

Thus the automatic establishment of this proportionality is caused with the greatest accuracy, for in the up and down movement of the rotor, practically no resistances have to be overcome, as due to its rotation the friction in the guides 12 and 13 is almost zero and no reaction forces are present.

For a better understanding of the properties, the device according to the invention is explained with reference to Figs. 3 and 4 in which the rotor-blades as well as the guide-vanes are shown lying unrolled with the preferred increasing pitch.

Figure 3:
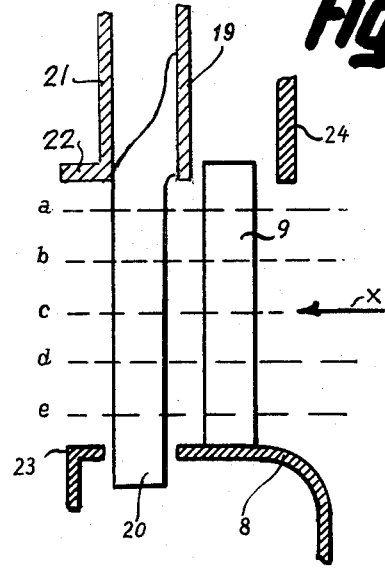
Fig. 3 shows an enlarged side elevation of a turbine blade and stationary vane as shown in Fig. 1.
Figure 4:
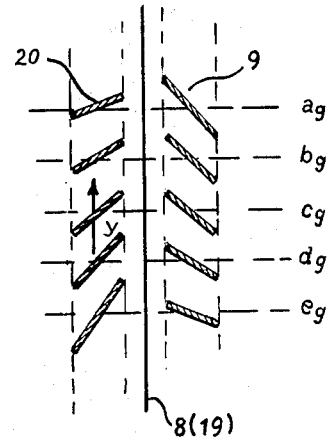
Fig. 4 shows various sections through the blades and vanes shown in Fig. 3.

Fig. 3 shows the meter-wheel (turbine-rotor) in its highest open position. The arrow X shows the direction of flow. Horizontal sections *a, b, c, d, e* are taken through the guide-vane 9 and the rotor blade 20, and appear as sections *ag, bg, cg, dg, eg,* in Fig. 4, which for the sake of simplicity are shown lying side by side. The sections of the oppositely-lying vanes and blades, 9 and 20, are so chosen with respect to each other as shown here that the rotation-velocities of the rotor blade 20, obtained from velocity diagrams, are approximately equal. They can, of course, be made different. It is only essential that the resulting rotation-velocity at any position is proportional to the rate of flow.

It is quite clear from a simple consideration of the relative triangles of velocity without further explanation that the meter-wheel in the position shown in Fig. 3 is at its highest rotation velocity, whereas the rotation velocity can be a very small value if the cylinder rim 22 approaches the opening-rim 23, for example when the section *ag* of the rotor-blade 20 and the section *eg* of the guide-vane are lying opposite each other. The rotation of the meter-wheel varies between a minimum in the smallest and a maximum in the largest measuring cross-section, that is, proportional to the rate of flow. In all these changes, as mentioned, the velocity of flow of the material in the measuring cross-section remains the same.

The invention is not limited to the embodiment illustrated in Figs. 1 to 4 but can be carried out and constructed in various ways.

Figure 5:
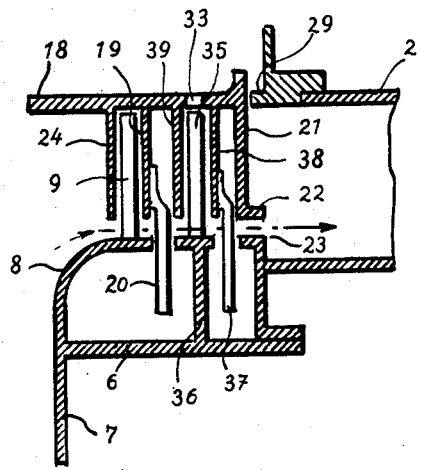
Fig. 5 shows another embodiment of the vane and turbine blade construction in accordance with the invention.

Thus the meter can be built having two or more circles of vanes or blades. An embodiment by way of example, in which a second guide-vane circle 35 is provided behind the rotor-blade circle 20 (as seen in the direction of flow of the material) which leads the material measured to a second rotor-blade circle secured to the rotor-bell 18, is illustrated in Fig. 5. The second guide-vane circle 35 is secured to a circular beam 36 provided on a flange 6, the second rotor-blade circle 37 is secured to a further cylindrical ring 38 of the rotor. The opening 33 which connects the space above the rotor-bell 18 with the measuring cross-section is here provided between the two cylindrical rings 38, 39 of the rotor, but can however, be arranged between the rings 38 and 21.

The second vane and blade circle pair 35 and 37 is specially protected against soiling. Under the action of its greater leverage, the moment of rotation of the rotor is considerably increased and the influence of the running resistance on the rotor relative to the moment of rotation is considerably decreased, so that an essential flatter course of the error-curve of the meter results. The alteration of direction of the flow effected by the second guide-vane circle 35 must be related to the increased running velocity of the rotor blade circle 37. The required entry angles are preferably determined empirically (by means of triangles of velocity) so that an entry as free from pulsations as possible is obtained. By the use of a three-circle rotor as the meter-wheel, the properties can be improved still further.

Figure 6:
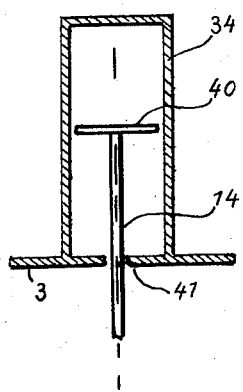
Fig. 6 shows an embodiment of the rotor shaft with a dampening device at its top.

In order to avoid, in sudden large loading variations, a jerking of the rotor in an axial direction, a damping device can be provided as, for example, in the form of a disc 40, which is secured to the upper end of the shaft 14, and only has little play against the walls of the extension 34 (see also Fig. 1). This arrangement is illustrated in Fig. 6. To increase the damping action, the opening 41 through which the shaft 14 passes from the extension 34 can be made correspondingly small.

If impure gases are being measured, then the construction of the rotor-bell according to Fig. 1 or 5 is preferred provided with two or more cylindrical rings which protect the measuring cross-section from soiling to the greatest extent.

Figure 7:
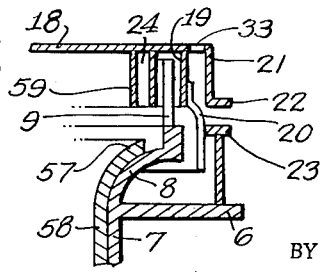
Fig. 7 shows a further embodiment of the turbine blade and stationary rotor vane construction in accordance with the invention; and, Fig. 8 shows a vertical axial section of a meter construction in accordance with the invention with a floater plate.

The embodiment in accordance with Fig. 7 shows that one edge of the outflow cross-section can be a nozzle-shape, the other a diaphragm-shape, and thus an approximately constant outflow coefficient is obtained. The upper outflow edge of the measuring cross-section is here formed by the edges of the cylindrical rims 24, 19, 21, and its outflow coefficient has a diaphragm characteristic. The lower outflow edge is formed in the above-mentioned sense by the nozzle-ring 57, 58, and consequently the lower edge of the measuring cross-section will have an outflow coefficient with a nozzle characteristic. A further cylindrical ring 59 located on the rotor bell 18 acts as a screen which prevents the soiling of the outflow edges on the lower rims of the rings 24 and 19.

A further embodiment is given by the arrangement of the auxiliary blowing device before the rotor-blade circle, which improves the starting of the turbine-rotor and ensures the accuracy of the measurement at the smallest rates of flow and comes out of action as soon as the rotor has risen to a definite adjustable degree. In the embodiment according to Fig. 1, such an auxiliary blowing device is provided in the form of an adjustable nozzle 60 which is protected from soiling by a filter 61. The adjustment of nozzle 60 is effected by simply screwing the nozzle in a higher or lower position. This can be so dimensioned and adjusted that it effects a moment of rotation on the rotor which is approximately the same as the moment of resistance which opposes the rotation of the rotor.

Figure 8:
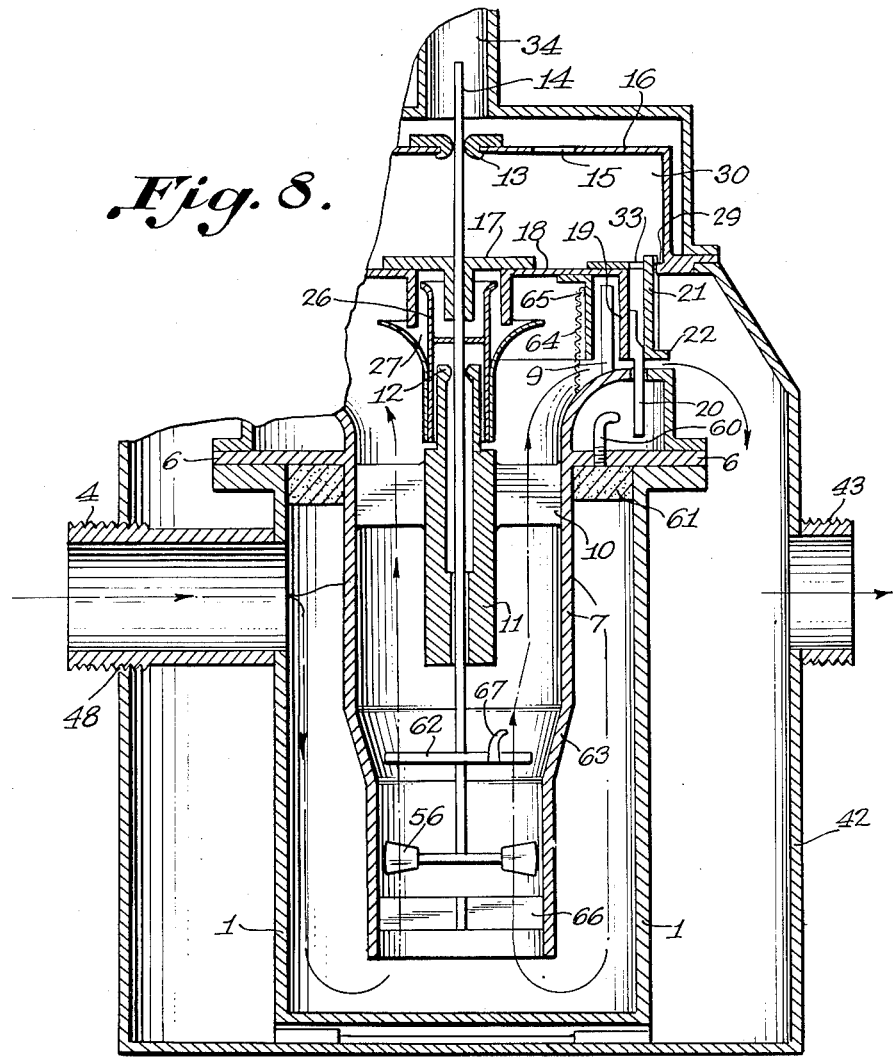

The smaller the diameter of the rotor, the greater is the share of the whole weight of the rotor falling on a surface unit of its base, and thus the greater must the pressure-difference on the two sides of the rotor be if it is to operated by this pressure-difference. A greater pressure-difference is, however, reflected by a greater velocity of flow, and this again by a greater rotor velocity. Consequently in small meters, if their measuring range is not limited, insupportably high velocities of rotation would result. Hence, further ways of carrying out the invention serve for the purpose of enabling small velocities of flow to be obtained in smaller meters and correspondingly small velocities of rotation of the rotor. These are illustrated in Fig. 8. One of them consists of a light floater plate 62 or the like which is arranged in the lower part of the guide-tube 7 and is secured on an extension of the rotor shaft 14 projecting downwardly into this. The shell 11 is increased somewhat in this case.

The lower part of the tube 7 is narrowed, preferably by a correspondingly constructed ring 63 of conical shape or of a type of truncated parabolical frustum, adjustable in height. In this smaller part, the floater plate 62 moves by the same amount to alter the open position of the rotor-bell 18. Thus the size of the ring cross-section between the floater plate 62 and the part 63 alters as in floater-meters. The size of the ring cross-section can be determined for example by making it and the measuring cross-sections always in a definite size relation to each other.

The floater plate 62 by which practically the effective upper surface of the rotor-bell 18 is increased, undergoes by the flowing through of the material a surplus of lifting power in proportion to a multiple of its weight, which is transferred by the shaft 14 to the rotor bell 18 and raises it. Consequently, the pressure difference of both sides of the rotor-bell 18 can be decreased by an amount corresponding to this surplus of lifting power without a sinking of the rotor, and the velocity of the flow of the material and thus the velocity of rotation of the rotor can be decreased by a corresponding amount.

By another formation of the part 63, the pressure-difference effective on the rotor-bell can be made variable in any other desired way, for example during the first part of the rotor-bell movement the velocity of flow remaining constant and in further rising of the rotor-bell increasing continually or stepwise as is required by the setting of the particular case. Thus by the adjustability of the part 63, there is a possibility of a most accurate adjustment and regulation of the rotation-velocity.

In small meters, however, in order to enable small velocities of rotation of the rotor, a greater meter-wheel diameter can be used and then by regulation of the weight of the rotor or by partial screening of a part of the measuring cross-section, the velocity of flow can be adjusted to the new conditions. Such screening is shown in Fig. 8 and is illustrated with reference 64. This forms at 65 a kind of labyrinth seal together with the cylindrical ring 24. This screening can be constructed from a plurality of mutually-interleaving and concentric cylinder parts on a common axis whereby the possibility is given of increasing and decreasing the screening at will. A further way of carrying out the invention is, for example, in making the two cups 26 and 27 different from those shown in Fig. 1 and at a definite distance from the rotor-bell 18 so that they are movable up and down with it. In this construction the protection in any open position of the rotor-bell 18 is the same, and the cup 27 always directs the flow to the measuring cross-section with reference to the particular height of said cross-section. The arrangement is shown, for example, in Fig. 8. A further possibility of construction is in strengthening the rotor blade circle by means of coaxially-arranged cross-rings. These give it the rigidity necessary for the highest velocity of rotation and serve simultaneously as the flow-guide. As the construction would be obvious to one skilled in the art from the above, a diagrammatic illustration appears to be unnecessary.

The embodiments and methods of practice described and illustrated can be used in various combinations, of which only one example is given here.

A further possible combination is illustrated in Fig. 8. As well as the above-mentioned floater-plate 62 with the constriction 63 of the cylinder-tube 67, a current fan 56 is provided. A known Woltman-fan with a connected flow-rectifier 66 serves as the current fan. The Woltman-fan acts on the rotor-shaft 14 and produces a considerable reserve of the moment of rotation in the case where the drive of the counting mechanism of the meter is affected by harmful influences, so that in such cases unwanted high errors are avoided. Moreover a reaction nozzle 67 is provided which is located in the floater-plate 62 and takes part in its rotation. This embodiment may, for example, be used in accordance with the meter shown in Fig. 1.

The lower limit of the measuring-range is decreased by the measuring wheel-meter according to the invention to an extent not obtained previously. Even slowly-moving amounts of material are readily indicated by it. This is due to the fact that no fluid is passed through the measuring opening in the zero position because of the tight closure, and the pressure-difference must reach the predetermined amount necessary in order to lift the bell and open the measuring passage.

Even, however, when the closure of the rotor-bell is not tight a satisfactory measurement in the lowest part of the measuring range is ensured. In this case, the rotor-bell begins to rotate before reaching the predetermined pressure-difference. However, the outflow cross-section still remains approximately constant and the velocity of flow is itself proportional to the rate of flow. The rotor rises only after reaching the predetermined pressure-difference, and the measurement now follows according to the invention with a constant velocity of flow in a variable outflow cross-section.

A further advantage of the measuring wheel-meter according to the invention is its high accuracy even if the meter is considerably overloaded. For with the upper position of the rotor-bell (which is set according to the existing requirements and corresponds usually to 1.2 to 1.5 times the nominal loading), the upper limit of its intended practical usability is still not reached. The rate of flow can be increased still further. However, the outflow and measuring cross-section now remains constant, that is, the measuring takes place at an outflow-velocity proportional to the rate of flow, as for an ordinary measuring wheel-meter.

Since the meter operates at a very small constant pressure-difference up to this point, the variable pressure-differences above this point are so slight that in this measuring range the above-mentioned volume-error of the ordinary measuring wheel-meters is not particularly noticeable, even if the rate of flow is doubled or trebled. The measuring varies in excess of the limits mentioned from one to the other principle of measurement and this changeover is caused without error in practice.

Finally it is noted that obviously, instead of the rotor-bell 18, the floater-plate 62 can serve in its lowest position as the closure for the passageway. This has the advantage that a very tight closure is obtained, and at the same time a wearing-out by use of the rim of the rotor-bell with the correspondingly decreased variability of the outflow-coefficient is avoided.

Of course, many other embodiments and variations will become apparent to the skilled artisan after reading the above. The particular embodiments and descriptions are, therefore, not set forth for the purpose of limitation but merely for illustration, the invention being limited by the appended claims or their equivalents.

I claim:

1. A meter for measuring fluid flowing through a pipe line comprising a meter housing, means defining a fluid entrance into said housing, means defining a substantially vertical fluid passage, centrally located within said housing and positioned for conducting fluid from said fluid entrance to the lower part of said housing and up through the central portion of said housing, a bell-shaped turbine rotor centrally positioned for rotation about a substantially vertical axis in the upper portion of said housing and freely axially displaceable between a position in substantially fluid-tight engagement with the upper portion of said means defining the fluid passage, and a position defining a maximum fluid-measuring passage with the upper portion of said means defining the fluid passage, means defining a fluid exit positioned for discharging fluid from said housing after passing through said measuring passage, at least one ring of turbine blades connected to said rotor and positioned at said measuring passage for rotating actuation by fluid passing through said measuring passage, at least one stationary ring of guide vanes positioned concentrically inside said ring of turbine blades for directing the flow of fluid therethrough, the vanes and blades of said rings of guide vanes and turbine blades having opposed pitches with at least one of said vanes and said blades being dimensioned with an increasing pitch along their length, whereby portions of said vanes and said blades with a decreasing angle therebetween become adjacently opposed as said rotor is axially displaced from said fluid-tight engagement, and means positioned for transmitting the rotation of said rotor to indicating means.

2. Meter according to claim 1, in which the upper part of said housing defines a labyrinth seal with said turbine rotor and including a fluid duct through the bottom of the rotor-bell and connecting said measuring passage and the housing part above said labyrinth seal.

3. Meter according to claim 2, in which a co-axial cylindrical ring is positioned on said rotor and in which said fluid duct is defined between said ring and said rotor.

4. Meter according to claim 1, in which said means defining the fluid passage is flared outwardly at the upper end thereof and said ring of turbine blades is rigidly positioned on said bell-shaped rotor so that they will extend past the upper lip of said means defining the fluid passage to a greater or lesser extent, depending upon the axial displacement of said turbine rotor.

5. Meter according to claim 1, in which the portion of said housing surrounding said measuring space is spirally formed.

6. Meter according to claim 1, including at least one coaxially-arranged rim positioned on said turbine rotor as a fluid flow guide.

7. Meter according to claim 1, including screening means positioned in front of at least a portion of said measuring passage.

8. Meter according to claim 1, in which said turbine rotor is mounted on a rotor shaft, said rotor shaft having dampening means positioned thereon for dampening any axial movement thereof.

9. Meter according to claim 8, in which said dampening means comprises piston means positioned at the end of said shaft and cylinder means surrounding said piston means.

10. Meter according to claim 1, in which said turbine rotor is mounted on an axially displaceable rotor shaft, said rotor shaft having a floater plate connected thereto at the lower end thereof.

11. Meter according to claim 10, in which a portion of said fluid passage surrounding said floater plate varies in diameter along the length of the axial displacement of said floater plate.

12. Meter according to claim 11, in which said floater plate has a reaction nozzle positioned thereon.

13. Meter according to claim 1, in which said turbine rotor is positioned on an axially-displaceable rotor shaft, and including a floater plate positioned on the lower end of said rotor shaft, said floater plate being in substantially fluid-tight engagement with said fluid passage at the lowest axially-displaceable position of said shaft.

14. Meter according to claim 1, in which said turbine rotor is positioned on an axially-displaceable rotor shaft and said shaft has a current fan connected thereto at the lower end thereof.

15. Meter according to claim 14, in which said fan is a Woltman fan and including a flow rectifier positioned in said fluid passage below said fan.

16. Meter according to claim 1, including an auxiliary fluid nozzle positioned for passing fluid against said turbine blades at the lowest position of said turbine rotor.

17. Meter according to claim 1, including at least two concentrically-arranged rings of turbine blades.

18. Meter according to claim 17, including at least two rings of stationary guide-vanes, one positioned in front of each of said rings of turbine blades.

19. Meter according to claim 1, in which said measuring passage is nozzle-shaped at one part thereof and diaphragm-shaped at the other part.

References Cited in the file of this patent

UNITED STATES PATENTS

| | | |
|---|---|---|
| 350,619 | Creuzbaur | Oct. 12, 1886 |
| 1,253,502 | Lambert | Jan. 15, 1918 |